US009816596B1

(12) United States Patent
Nelson et al.

(10) Patent No.: US 9,816,596 B1
(45) Date of Patent: Nov. 14, 2017

(54) TORQUE CONVERTER INCLUDING SPACER PLATE FOR COAST ENGAGEMENT DIAPHRAGM SPRING

(71) Applicant: Schaeffler Technologies AG & Co. KG, Herzogenaurach (DE)

(72) Inventors: Kyle Nelson, Dover, OH (US); David Avins, Burbank, OH (US); Sagar Adari, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/140,757

(22) Filed: Apr. 28, 2016

(51) Int. Cl.
*F16H 45/02* (2006.01)
*F16H 41/28* (2006.01)

(52) U.S. Cl.
CPC ............ *F16H 45/02* (2013.01); *F16H 41/28* (2013.01); *F16H 2045/0221* (2013.01)

(58) Field of Classification Search
CPC ............ F16H 45/02; F16H 2045/0221; F16H 2045/0226; F16H 41/24
See application file for complete search history.

(56) References Cited

U.S. PATENT DOCUMENTS

| 4,441,595 A | 4/1984 | Lamarche |
| 4,867,290 A | 9/1989 | MacDonald et al. |
| 5,046,591 A * | 9/1991 | Hageman ............ F16H 45/02 192/214.1 |
| 9,080,616 B2 | 7/2015 | Luipold et al. |
| 2004/0251104 A1* | 12/2004 | Abe .................. F16H 45/02 192/3.29 |
| 2010/0116614 A1 | 5/2010 | Sturgin |
| 2013/0230385 A1* | 9/2013 | Lindemann ......... F16D 33/18 415/122.1 |
| 2014/0097055 A1 | 4/2014 | Lindemann et al. |
| 2015/0037158 A1 | 2/2015 | Steinberger et al. |
| 2016/0153534 A1* | 6/2016 | Lindemann ......... F16H 45/02 192/3.28 |

OTHER PUBLICATIONS

International Search Report and Written Opinion for corresponding PCT application.

\* cited by examiner

*Primary Examiner* — Huan Le
(74) *Attorney, Agent, or Firm* — Davidson, Davidson & Kappel, LLC

(57) ABSTRACT

A torque converter is provided. The torque converter includes a damper assembly and a turbine assembly connected to the damper assembly. The turbine assembly includes an axially movable turbine piston, a spacer plate fixed to the turbine piston and a bias spring. The spacer plate retains the bias spring on the turbine piston with a preload force. A method of forming a torque converter is also provided. The method includes providing a bias spring contacting a front cover side surface of a turbine piston; and fixing a spacer plate to the turbine piston such that the spacer plate holds the bias spring against the front cover side surface of the turbine piston.

17 Claims, 4 Drawing Sheets

TORQUE CONVERTER INCLUDING SPACER PLATE FOR COAST ENGAGEMENT DIAPHRAGM SPRING

The present disclosure relates generally to torque converters and more specifically to torque converters including a turbine piston.

BACKGROUND

U.S. Pat. No. 9,080,616 discloses transmission subassembly that includes a contained return spring. U.S. Publication No. 2014/0097055 discloses a torque converter with a turbine piston, which is an axially movable turbine used as a piston of a lockup clutch.

SUMMARY OF THE INVENTION

A torque converter is provided. The torque converter includes a damper assembly and a turbine assembly connected to the damper assembly. The turbine assembly includes an axially movable turbine piston, a spacer plate fixed to the turbine piston and a bias spring. The spacer plate retains the bias spring on the turbine piston with a preload force.

A method of forming a torque converter is also provided. The method includes providing a bias spring contacting a front cover side surface of a turbine piston; and fixing a spacer plate to the turbine piston such that the spacer plate holds the bias spring against the front cover side surface of the turbine piston.

BRIEF DESCRIPTION OF THE DRAWINGS

The present invention is described below by reference to the following drawings, in which:

FIG. 1a shows cross-sectional side views of a torque converter in accordance with an embodiment of the present invention;

FIG. 1b shows a view along A-A of FIG. 1a;

FIG. 2 shows a cross-sectional side view of a radially inner portion of turbine assembly of the torque converter shown in FIG. 1a;

DETAILED DESCRIPTION

Figures 1A, 1B:
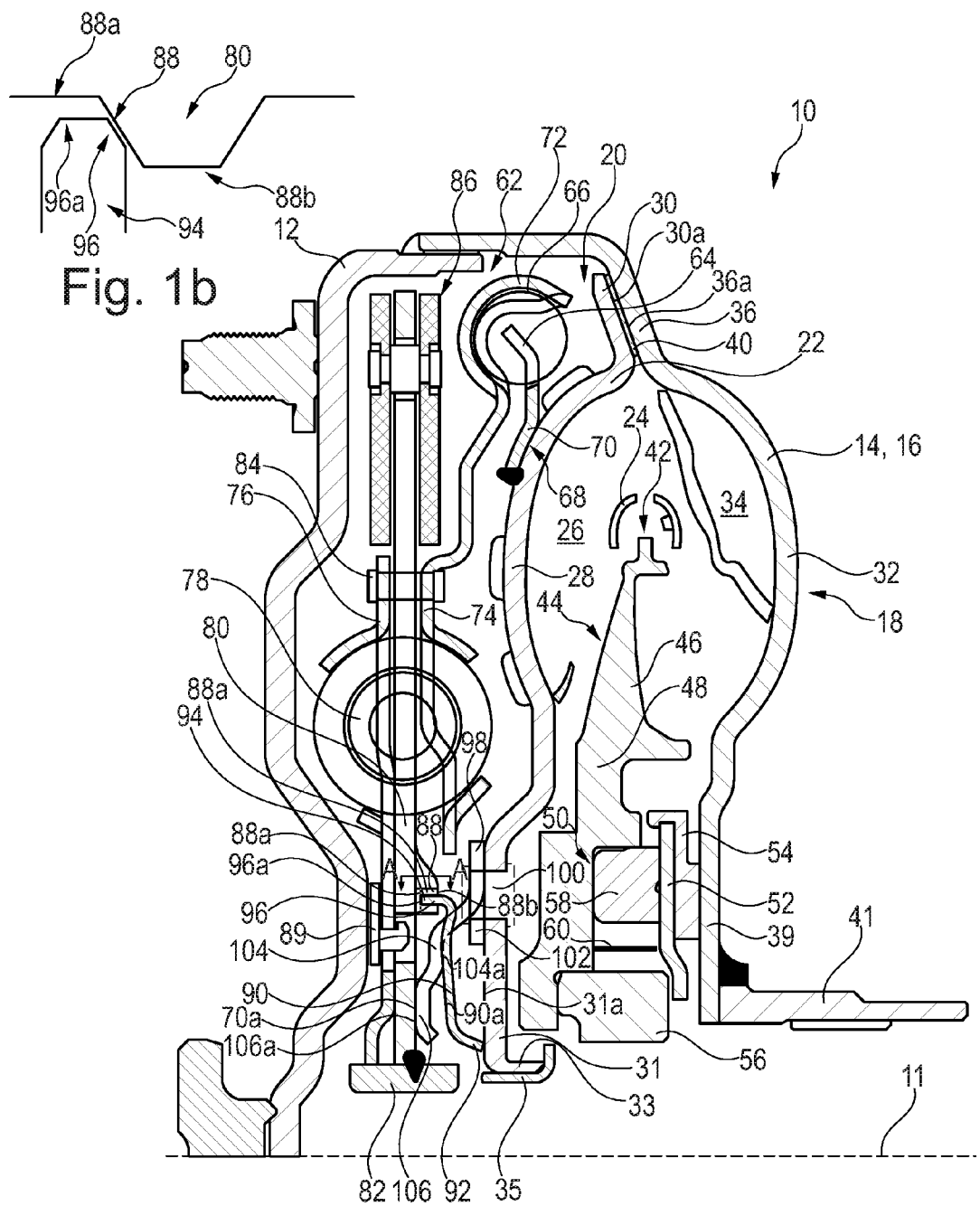

The disclosure provides a spacer plate to capture a diaphragm spring, thus eliminating the need for an additional outer diameter tab formed on the diaphragm spring to maintain preload and transmit torque. The spacer plate includes function of two tabs in one by transmitting torque directly through the ramp tab to the spacer plate. The spring preload is held on the outer diameter of the spring body. Torque is advantageously transferred locally at the outer diameter tab and bending moment is practically eliminated, thus extending fatigue life.

FIG. 1 shows cross-sectional side views of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine assembly 19 in accordance with an embodiment of the present invention. Turbine assembly 19 includes a turbine 20 configured to define a piston that is axially moveable toward and away from impeller 18 to engage and disengage an impeller clutch of impeller 18 so as to form a lockup clutch. Turbine piston 20 includes a turbine shell 22 and a core ring 24 supporting a plurality of turbine blades 26 therebetween.

Turbine shell 22 includes a rounded blade supporting portion 28, which is shaped as an annular bowl, for contacting engine side edges of turbine blades 26. Radially outside of blade supporting portion 28, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumference of turbine piston 20. Accordingly, the piston and turbine shell 22 are formed as a single piece. Radially inside of blade supporting portion 28, turbine shell 22 includes an annular inner radial extension 31 that, at an inner radial end thereof, joins an axially extending inner circumferential section 33, whose inner circumferential surface contacts an outer circumferential surface of a hub 35.

Impeller 18 includes impeller blades 34, which are each fixed at a transmission side thereof to impeller shell 16 and are each fixed to an impeller core ring 37 at an engine side thereof by tabs. Impeller shell 16 includes a rounded blade supporting portion 32, which is shaped as an annular bowl, for contacting transmission side edges of impeller blades 34. Radially outside of blade supporting portion 32, a radially extending wall 36, which forms an impeller clutch, radially protrudes outwardly from an outer circumference of rounded blade supporting portion 32 to define an annular wall having a flat annular radially extending turbine facing surface 36a. Accordingly, the impeller clutch and impeller shell 16 are formed as a single piece. Radially inside of blade supporting portion 32, impeller shell 16 includes an annular inner radial extension 39 extending radially inward from blade supporting portion 32. A radially inner end of extension 39 is connected to an impeller hub 41.

A friction material 40 is bonded onto radially extending impeller facing surface 30a of outer radial extension 30 for engaging radially extending wall 36. In other embodiments, instead of or in addition to being bonded to outer radial extension 30, friction material 40 may be bonded to radially extending turbine facing surface 36a of radially extending wall 36. Regardless of whether friction material 40 is bonded to outer radial extension 30 or radially extending wall 36, friction material 40 is provided axially between surfaces 30a, 36a.

Torque converter 10 also includes a stator 42 axially between turbine 20 and impeller 18 to redirect fluid flowing from the turbine blades 26 before the fluid reaches impeller 18 to increase the efficiency of torque converter 10. Stator 42 includes stator casting 44 including a plurality of blades 46 and a stator body 48. Stator 42 also includes a one-way clutch 50 held within stator body 48 by a centering plate 52. An axial thrust washer 54, which is axially between stator 42 and impeller 18, is fixed to stator 42 at an outer circumference of centering plate 52. One-way clutch 50 includes an inner race 56, an outer race 58 and rollers and springs 60 radially between inner race 56 and outer race 58. Stator casting 44 is rotationally fixed to outer race 58, and depending on the operating conditions of torque converter 10, inner race 56 and outer race 58 are rotationally fixed to each other or rotatable relative to each other.

A damper assembly 62 is positioned between front cover 12 and turbine 20 and is configured for transferring torque from turbine 20 to a transmission input shaft. In this embodiment, damper assembly 62 is connected to the turbine piston 20 for rotation therewith by drive tabs 64 circumferentially engaging a radially outer set of springs 66 of damper assembly 62. Drive tabs 64 as formed as part of a drive ring 68 of turbine assembly 19. Drive ring 68 is fixed to a front cover facing surface of turbine shell 22 at blade supporting portion 28. An annular base 70 of drive ring 68 is fixed in contact with front cover facing surface of turbine shell 22 by welding or brazing. Drive tabs 64 are circumferentially spaced from each other and extend into spaces formed circumferentially between springs 66 to contact circumferential edges of springs 66. Springs 66 are retained by a spring retainer 72 that wraps around a contour of the outer diameter of springs 66 and is formed at a radially outer end of a first or turbine side cover plate 74 of damper assembly 62. Damper assembly 62 further includes a second or front cover side cover plates 76.

Cover plates 74, 76 support a set of radially inner springs 78, which are radially inside of springs 66, axially therebetween. Damper assembly 62 also includes a drive flange 80 positioned axially between cover plate 74, 76 including a hub 82 at a radially inner end thereof configured for non-rotatably connecting to a transmission input shaft. Radially outside of springs 78, cover plates 74, 76 are fixed together by a plurality of circumferentially spaced rivets 84. Drive flange 80 includes circumferentially extending slots for receiving springs 66 formed therein and a centrifugal pendulum absorber 86 at a radially outer end thereof. Radially inside of springs 66, drive flange 80 is provided with a plurality of surfaces 88 formed as ramps that each taper axially from a first edge 88a that is axially furthest from turbine 20 to a second edge 88b that is axially closest to turbine 20. First edge 88a is the flange surface that runs all the way from the inner diameter of flange 80 to the outer diameter of flange 80 and second edge 88b is the top of the flange ramps. A thrust washer 89 is provided at a front cover side of second cover plate 76 to contact an inner surface of front cover 12 to prevent cover plate 76 from frictionally engaging front cover 12 during rotation thereof about axis 11.

Turbine assembly 19 also includes a turbine-side bias spring 90, which in this embodiment is a diaphragm spring, provided axially between flange 70 and inner radial extension 31 of turbine 20. At an inner diameter of a base ring 91 thereof, bias spring 90 includes a plurality of radially and axially extending tabs 92 for contacting front cover side surface 31a of inner radial extension 31. At an outer diameter of base ring 91, bias spring 90 includes a plurality of axially extending drive flange engaging tabs 94, each provided with a ramp contacting surface 96 at a side thereof formed as ramps that each taper from an axial free end 96a thereof for contacting a respective one of ramps 88 of drive flange 70. The arrangement of tabs 94 with respect to ramps 88 is shown by FIG. 1b, which illustrates a view of one of tabs 94 and one of ramps 88 along A-A of FIG. 1a. As shown in FIG. 1b, ramps 96 taper in a manner that match the respective ramps 88 and travel up and onto edges 88b. An axial clearance is provided first edge 88a and axial free end 96a. Each ramp 88 contacts one of surfaces 96 such that relative circumferential motion between drive flange 70 and bias spring 90 causes contact between the ramps 88 and surfaces 96 to generate a force on turbine piston 20. When damper assembly 62 travels into the coast direction, ramps 88 contact surfaces 96 to produce an axial force that is transmitted by bias spring 90 to turbine piston 20. In alternative embodiment, surfaces 96 may be formed as ramps that taper in a manner that match the respective ramps 88. In other embodiments, surfaces 96 may be formed as ramps instead of surfaces 88.

Turbine assembly 19 further includes a spacer plate 98 capturing diaphragm spring 90. Spacer plate 98 is fixed to inner radial extension 31 of turbine 20 by a plurality of circumferentially spaced rivets 100. Spacer plate 98 includes an outer annular base section 102 contacting front cover side surface 31a of inner radial extension 31 and receiving rivets 100. Outer base section 102 forms an outer diameter of spacer 98. A plurality of circumferentially spaced fingers 104 protrude axially away from and radially inward from base section 102 and extend axially through spaces circumferentially between diaphragm engaging tabs 94 to join an annular inner base section 106, which form an inner diameter of spacer 98. Fingers 104, via a turbine side surface 104a thereof, contact a front cover side surface 90a of diaphragm spring 90 to prevent diaphragm spring 90 from moving axially away from turbine 20. A front cover side surface 106a of inner base section 106 contacts a turbine side surface 70a of drive flange 70.

A method of forming torque converter 10 may include providing bias spring 90 in contact with front cover side surface 31a of inner radial extension 31 of turbine piston 20 and then fixing spacer plate 98, via rivets 100, to turbine piston 20 such that spacer plate 98 holds bias spring 90 against front cover side surface 31a of inner radial extension 31 of turbine piston 20.

Figure 2:
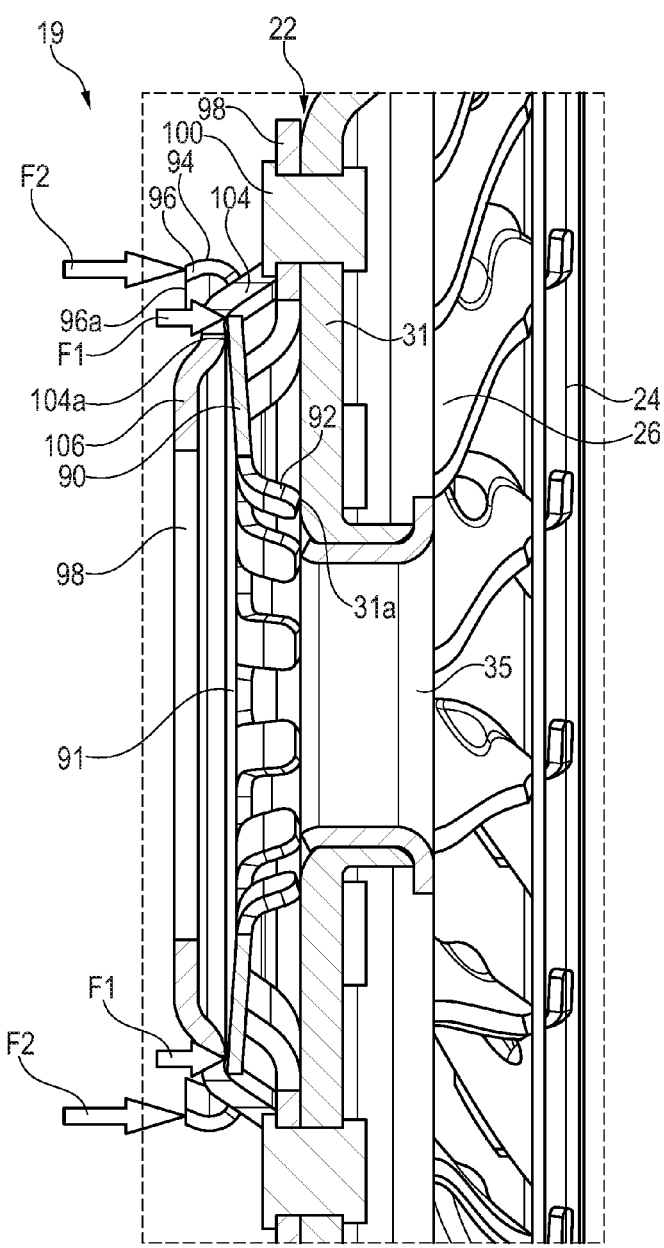
Figure 3:
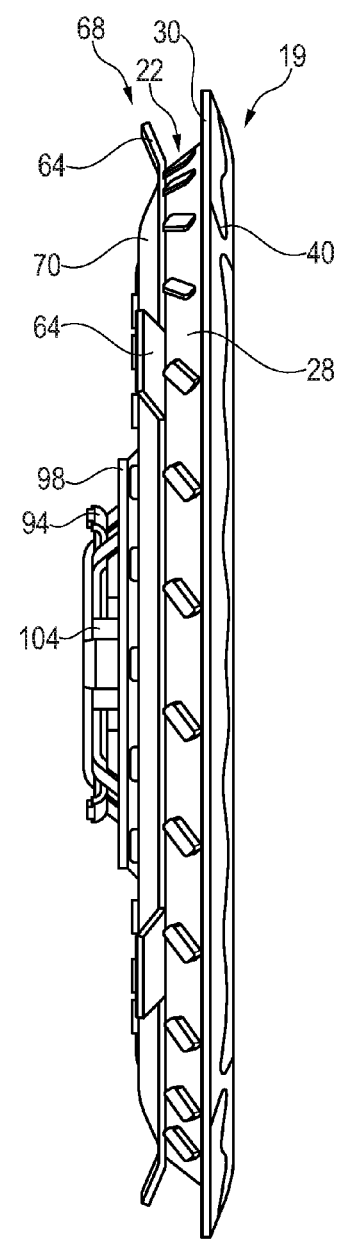
FIG. 3 shows a side view of the entirety of the turbine assembly shown in FIG. 2.
Figure 4:
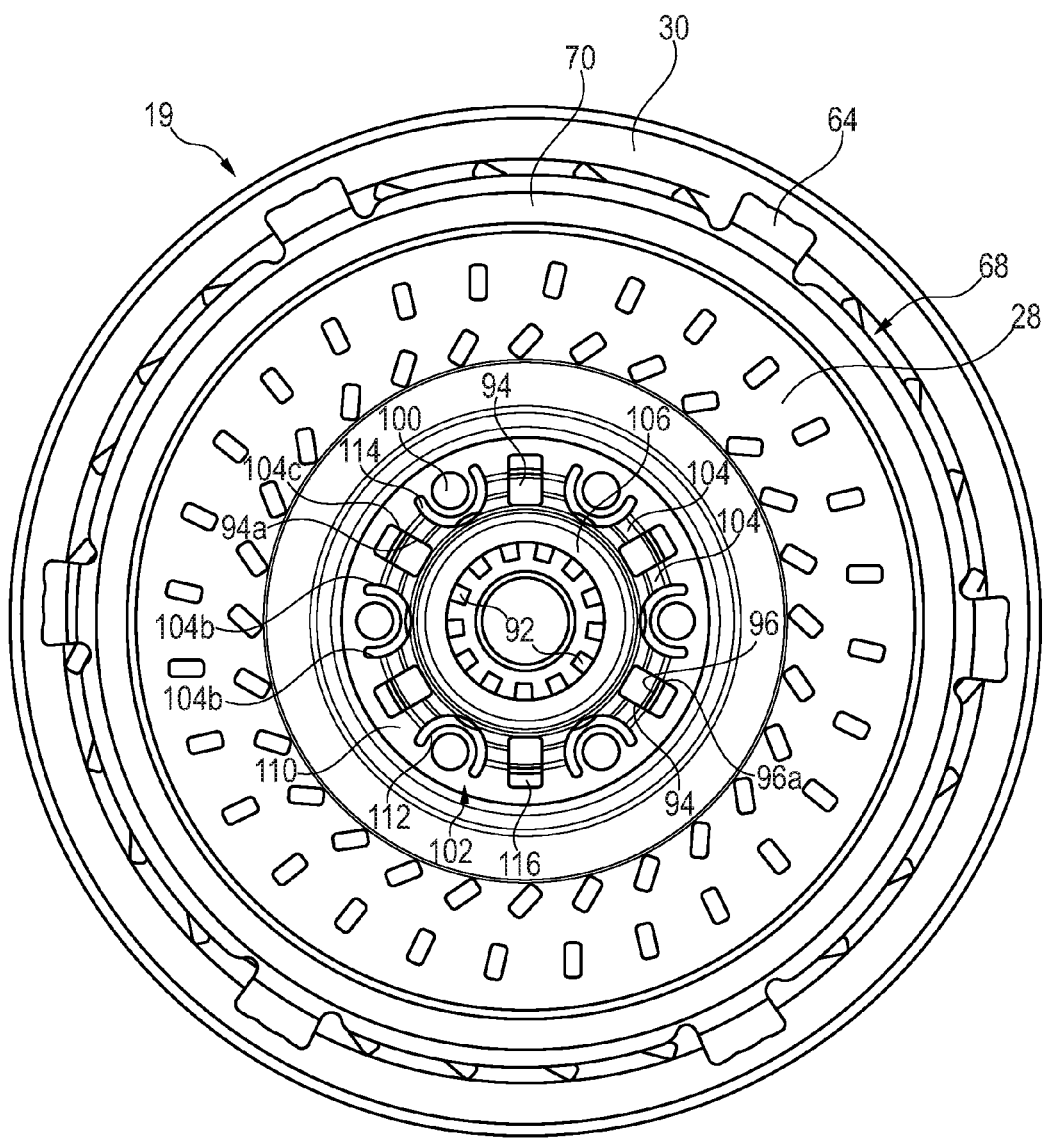
FIG. 4 shows a plan view of a front cover facing side of the turbine assembly shown in FIGS. 2 and 3.
Figure 5:
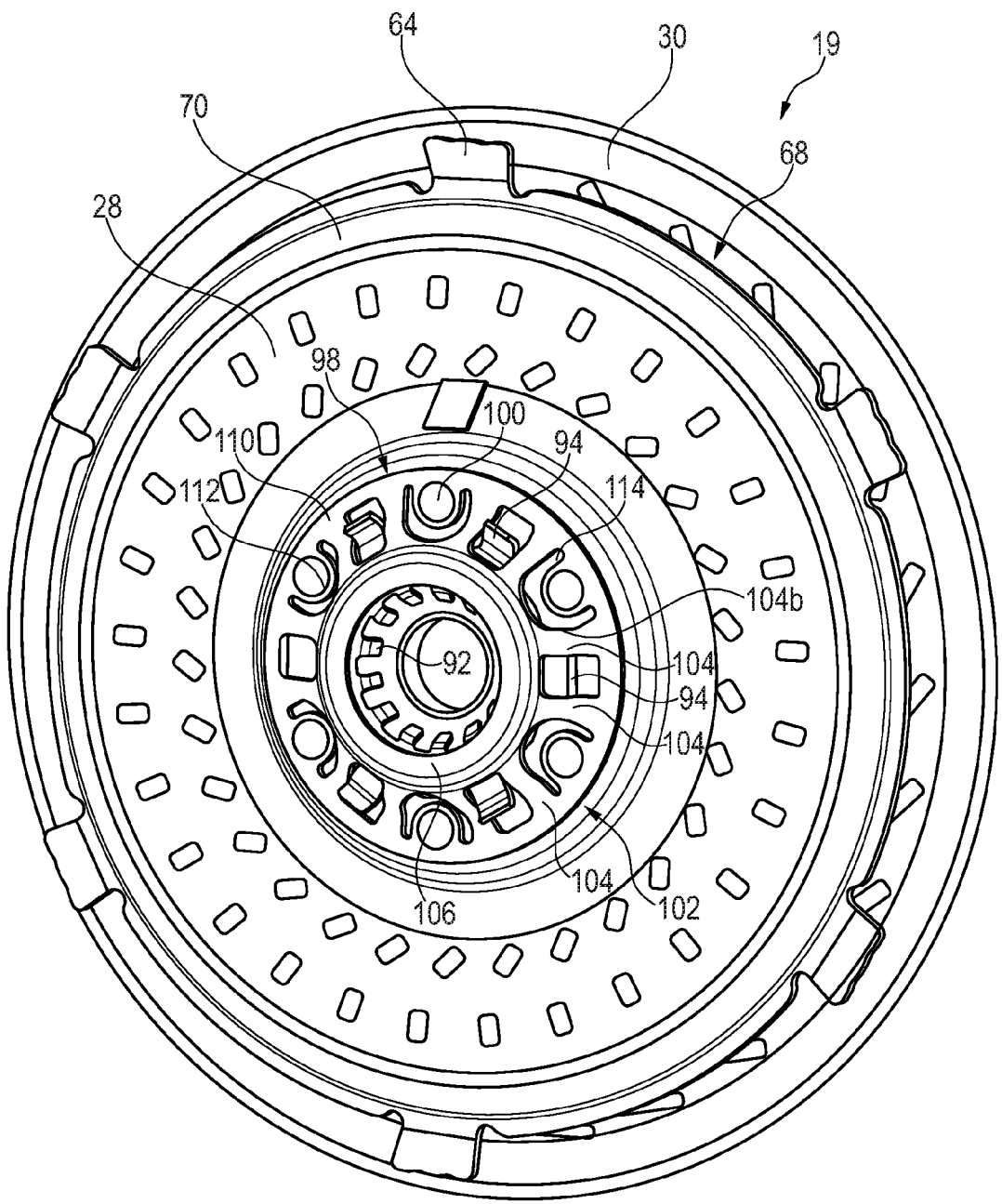
FIG. 5 shows a perspective view of the front cover facing side of the turbine assembly shown in FIGS. 3 to 5.

FIGS. 2 to 5 illustrate various views of turbine assembly 19. FIG. 2 shows a cross-sectional side view of a radially inner portion of turbine assembly 19, providing an enlarged view of diaphragm spring 90 and spacer plate 98. FIG. 3 shows a side view of the entirety of turbine assembly 19. FIG. 4 shows a plan view of a front cover facing side of turbine assembly 19. FIG. 5 shows a perspective view of the front cover facing side of turbine assembly 19.

FIG. 2 illustrates spacer plate 98 being fixed to inner radial extension 31 of turbine shell 22 by rivets 100. Fingers 104 extend from outer base section 98 in between tabs 94 to inner base section 106 and contact a front cover side surface 91a of base ring 91 of diaphragm spring 90 via turbine side surfaces 104a of fingers 104 to maintain a preload force F1 and transmit coast torque from piston turbine 20 to diaphragm spring 90. Inner tabs 92 contact front cover side surface 31a of inner radial extension 31 and outer tabs 94 are configured for contacting ramps 88 of drive flange 70 (FIGS. 1a, 1b) to generate a ramp load force F2. Tabs 92 extend from the inner diameter of base ring 91 of diaphragm spring 90 and tabs 94 extend from the outer diameter of base ring 91. FIG. 2 further illustrates turbine blades 26 and the attachment of turbine blades 26 to core ring 24.

FIG. 3 illustrates the positioning of spacer plate 98 and diaphragm spring 90 on turbine shell 22. Outer tabs 94 are shown extending radially through spaces formed between fingers 104 and outside past fingers 104. Drive ring 68 is shown fixed to a front cover facing surface of turbine shell 22 at blade supporting portion 28, with annular base 70 being is fixed in contact with the front cover facing surface of turbine shell 22 and drive tabs 62 protruding radially outward and axially away from annular base 70. FIG. 3 further illustrates friction material 40 formed as a ring on outer radial extension 30 of turbine shell 22.

FIGS. 4 and 5 illustrate the shape of outer base section 102 of spacer plate 98. Outer base section include an outer ring 110 forming an outer circumferential surface of spacer plate 98 and rivet receiving protrusions 112 extending radially inward from outer ring 110 for receiving rivets 100. As viewed axially, as shown in FIG. 4, inner surfaces of protrusions 112 are defined by arc-shaped cutouts 114 formed in spacer plate 98. Arc-shaped cutouts 114 also each define one edge 104b of two different fingers 104. Further cutouts 116, which are rectangular in shape with curved corners as viewed axially, are provided between cutouts 114, such that cutouts 114 alternate with cutouts 116 in the circumferential direction. Cutouts 116 also each define one contact edge 104c of one of fingers 104, such that every other finger 104 includes one contact edge 104c. In standard operation, a torque transmitting side surface 94a of each of tabs 94 of bias spring 90 contacts and transmits torque through a respective one of contact edges 104c. Accordingly, tabs 94 transmit torque from turbine 20 through spacer plate 98 via contact edges 104c to generate the axial force via ramps 96 Cutouts 114, 116 are all formed radially between outer base section 102 and inner base section 106. Each of outer tabs 94 extends radially and axially through a respective one of cutouts 114. Inner tabs 92 extend radially inside of the inner diameter of inner base section 106. Rounded blade supporting portion 28 is positioned radially outside of space plate 98 and supports drive ring 68, which includes annular base 70 and a plurality of circumferentially spaced drive tabs 64. Outer radial extension 30 of turbine shell 22 extends radially outside past drive ring 68.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
   a damper assembly; and
   a turbine assembly connected to the damper assembly, the turbine assembly comprising:
   an axially movable turbine piston;
   a spacer plate fixed to the turbine piston; and
   a bias spring, the spacer plate retaining the bias spring on the turbine piston with a preload force.

2. The torque converter as recited in claim 1 wherein the damper assembly includes a drive flange configured for connecting to a transmission input shaft, the drive flange including surfaces contacting the bias spring that are configured such that when the damper assembly travels into a coast direction an axial force is exerted on the turbine piston by the bias spring.

3. The torque converter as recited in claim 2 wherein the bias spring includes outer tabs configured for contacting the surfaces of the drive flange.

4. The torque converter as recited in claim 3 wherein at least one of the surfaces of the drive flange and surfaces of the outer tabs are axially tapered to form ramps.

5. The torque converter as recited in claim 3 wherein the spacer plate includes an outer base section fixed onto the turbine piston and fingers protruding axially and radially from the base section, the fingers extending through spaces formed between the outer tabs.

6. The torque converter as recited in claim 5 wherein at least one of the fingers includes a contact edge configured for contacting a side surface of a respective one of the outer tabs to transmit torque from the turbine piston to the bias spring through the spacer plate to generate the axial force.

7. The torque converter as recited in claim 5 wherein the bias spring is a diaphragm spring including a base ring, the outer tabs being formed at an outer diameter of the base ring, the fingers contacting a front cover side surface of the base ring to hold the diaphragm spring against the turbine piston.

8. The torque converter as recited in claim 5 wherein the spacer plate includes an inner base section contacting a turbine side surface of the drive flange, the fingers extending from the outer base section to the inner base section.

9. The torque converter as recited in claim 1 further comprising an impeller shell, the turbine piston including an outer radial extension configured for frictionally engaging with and disengaging from the impeller shell to form a lockup clutch.

10. The torque converter as recited in claim 1 wherein the turbine piston includes an annular inner radial extension, the bias spring including inner tabs contacting the annular inner radial extension.

11. The torque converter as recited in claim 1 wherein the turbine assembly includes a blade supporting portion and drive tabs fixed to the blade supporting portion, the damper assembly including a plurality of circumferentially spaced springs, the drive tabs circumferentially engaging the springs to connect the turbine assembly to the damper assembly.

12. A method of forming a torque converter comprising:
    providing a bias spring contacting a front cover side surface of a turbine piston; and
    fixing a spacer plate to the turbine piston such that the spacer plate holds the bias spring against the front cover side surface of the turbine piston.

13. The method as recited in claim 12 further comprising connecting the turbine piston to a damper assembly including a drive flange with surfaces of the drive flange contacting the bias spring such that when the damper assembly travels into a coast direction contact between the surfaces of the drive flange and the bias spring result in an axial force being exerted on the turbine piston by the bias spring.

14. The method as recited in claim 13 further comprising fixing drive tabs to a blade supporting portion of the turbine piston, the damper assembly including a plurality of circumferentially spaced springs, the drive tabs circumferentially engaging the springs to connect the turbine piston to the damper assembly.

15. The method as recited in claim 12 wherein the spacer plate includes an outer base section fixed in contact with the turbine piston and fingers protruding axially and radially from the base section, the fingers extending through spaces formed between outer tabs of the bias spring.

16. The method as recited in claim 15 wherein at least one of the fingers includes a contact edge configured for contacting a side surface of a respective one of the outer tabs to transmit torque from the turbine piston to the bias spring through the spacer plate to generate the axial force.

17. The method as recited in claim 15 wherein the bias spring is a diaphragm spring including a base ring, the outer tabs being formed at an outer diameter of the base ring, the fingers contacting a front cover side surface of the base ring to hold the diaphragm spring against the turbine piston.

* * * * *